United States Patent
Jiang et al.

(10) Patent No.: US 10,023,723 B2
(45) Date of Patent: Jul. 17, 2018

(54) PROCESS FOR PREPARING RUBBER COMPOSITIONS AND ARTICLES MADE THEREFROM

(75) Inventors: Ping Jiang, New City, NY (US); Robert James Perry, Niskayuna, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 11/810,300

(22) Filed: Jun. 5, 2007

(65) Prior Publication Data

US 2008/0306213 A1 Dec. 11, 2008

(51) Int. Cl.
- C08K 5/31 (2006.01)
- C08K 5/54 (2006.01)
- C08K 5/548 (2006.01)

(52) U.S. Cl.
CPC ............... *C08K 5/31* (2013.01); *C08K 5/548* (2013.01)

(58) Field of Classification Search
CPC .................................. C08K 5/31; C08K 5/548
USPC ......................................................... 524/492
See application file for complete search history.

(56) References Cited

U.S. PATENT DOCUMENTS

| | | | | |
|---|---|---|---|---|
| 2,118,601 A * | 5/1938 | Gerke | ............... | C08J 3/203 152/209.1 |
| 5,116,886 A | 5/1992 | Wolff et al. | | |
| 5,268,439 A | 12/1993 | Hergenrother et al. | | |
| 5,821,290 A | 10/1998 | Labauze | | |
| 6,005,027 A | 12/1999 | Guillet et al. | | |
| 6,022,923 A * | 2/2000 | Araki et al. | ................... | 524/494 |
| 6,414,061 B1 | 7/2002 | Cruse et al. | | |
| 6,720,369 B2 * | 4/2004 | Goerl et al. | ................... | 523/215 |
| 6,765,045 B1 * | 7/2004 | Daniel et al. | ................... | 524/237 |
| 6,780,925 B2 * | 8/2004 | Materne et al. | ............... | 524/571 |
| 6,822,037 B2 * | 11/2004 | Schaal et al. | ................... | 524/492 |
| 6,951,897 B2 * | 10/2005 | Penot | ............... | 524/492 |
| 7,132,471 B2 * | 11/2006 | Fusamae et al. | ............. | 524/502 |
| 7,160,956 B2 * | 1/2007 | Heiliger et al. | ............ | 525/332.6 |
| 7,307,121 B2 * | 12/2007 | Zhang et al. | ................... | 524/502 |
| 2002/0132902 A1* | 9/2002 | Shiono | ........................... | 524/492 |
| 2003/0119946 A1* | 6/2003 | Chen et al. | ................... | 523/334 |
| 2003/0171478 A1* | 9/2003 | Resendes | ....................... | 524/492 |
| 2004/0054060 A1* | 3/2004 | Kirino et al. | ................... | 524/492 |
| 2004/0152811 A1 | 8/2004 | Lin et al. | | |
| 2005/0009955 A1* | 1/2005 | Cohen | ........................... | 523/212 |
| 2005/0016650 A1* | 1/2005 | Durel et al. | ................. | 152/209.1 |
| 2005/0080179 A1* | 4/2005 | Kim et al. | ..................... | 524/445 |
| 2005/0239946 A1* | 10/2005 | Lin et al. | ....................... | 524/492 |
| 2005/0267247 A1* | 12/2005 | Steger et al. | .................. | 524/492 |
| 2005/0277717 A1* | 12/2005 | Joshi et al. | .................... | 524/261 |
| 2006/0128854 A1* | 6/2006 | Bowen et al. | ................. | 524/261 |
| 2006/0165581 A1* | 7/2006 | Stenzel et al. | ................ | 423/339 |
| 2006/0281009 A1* | 12/2006 | Boyer et al. | .................. | 429/247 |
| 2007/0015861 A1* | 1/2007 | Minagawa et al. | ........... | 524/492 |
| 2007/0037915 A1* | 2/2007 | Masumoto | ..................... | 524/492 |
| 2007/0078202 A1* | 4/2007 | Mihara et al. | ................. | 523/212 |
| 2007/0093612 A1* | 4/2007 | Perry et al. | ................. | 525/333.9 |
| 2007/0112119 A1* | 5/2007 | Mabuchi et al. | ............. | 524/492 |
| 2007/0155889 A1* | 7/2007 | Okamoto et al. | ............. | 524/492 |
| 2007/0208126 A1* | 9/2007 | Garro et al. | .................... | 524/492 |
| 2007/0228322 A1* | 10/2007 | Chaves et al. | ............. | 252/182.3 |
| 2007/0272339 A1* | 11/2007 | Colvin et al. | ................. | 152/458 |
| 2007/0276078 A1* | 11/2007 | Pottier et al. | ................. | 524/492 |

FOREIGN PATENT DOCUMENTS

| | | |
|---|---|---|
| CN | 1882504 A | 12/2006 |
| EP | 0631982 | 1/1995 |
| JP | 200677097 | 3/2006 |
| JP | 2007154130 | 6/2007 |
| WO | WO 2005049493 A1 * | 6/2005 |
| WO | 20060102518 A1 | 9/2006 |

OTHER PUBLICATIONS

Yan et al. Journal of Polymer Science: Part B: Polymer Physics, vol. 43, 573-584 (2005).*
Yan et al. Journal of Applied Polymer Science, vol. 94, 2295-2301 (2004).*
First Office Action for Japanese Patent Application No. 2010-511183 dated May 7, 2013.
Yan, et al. "Effects of Silane Coupling Agents on the Vulcanization Characteristics of Natural Rubber," *Journal of Applied Polymer Science*, 2004; vol. 94; pp. 1511-1518.

* cited by examiner

*Primary Examiner* — Liam J Heincer
(74) *Attorney, Agent, or Firm* — James C. Abruzzo

(57) ABSTRACT

A process for preparing a rubber composition comprises:
(a) forming a mixture of:
  (i) at least one thiocarboxyl-functional hydrolyzable silane,
  (ii) at least one rubber containing carbon-carbon double bonds,
  (iii) at least one silane-reactive filler,
  (iv) at least one activating agent, and
  (v) water;
(b) mixing the composition formed in step (a) under reactive-mechanical-working conditions and in the absence of vulcanizing agent(s);
(c) adding at least one vulcanizing agent (vi) to the composition of step (b);
(d) mixing the composition of step (c) under non-reactive-mechanical-working conditions; and,
(e) optionally, curing the rubber composition of step (d).

28 Claims, No Drawings

PROCESS FOR PREPARING RUBBER COMPOSITIONS AND ARTICLES MADE THEREFROM

BACKGROUND OF THE INVENTION

The present disclosure relates to processes for preparing rubber compositions and articles made therefrom.

The use of silica/silane-filler systems to reduce the rolling resistance and improve the wet traction of passenger car tires is well known in the art. A reduction of rolling resistance, and therefore less fuel consumption, while improving handling, wear and wet and dry traction, continues to be the subject of much technical investigation and development.

Polysulfurized alkoxysilanes, such as bis(triethoxysilylpropyl)tetrasulfite (TESPT) and blocked mercapto-functional silanes such as 3-octanoylthio-1-propyltriethoxysilane are currently the most effective, and therefore the most widely used, coupling agents in rubber compositions intended for tires, especially those compositions containing styrene-butadiene rubber or butadiene rubber. The processing of polysulfurized alkoxysilanes tends to be poor, as reflected by scorch, due to the high reactivity of the polysulfide functional group and its ability to donate sulfur, a curative, during mixing. Rubber formulations containing silica and polysulfurized alkoxysilanes require multiple non-productive mixing cycles at low temperatures and may still partially cure during these mixing operations generating waste, both of which drawbacks can add significantly to production costs.

Although blocked mercapto-functional silanes eliminate many of the problems associated with processing silica-reinforced tires, these compounds often fail to achieve the levels of reinforcing efficiency and abrasion resistance desired by the tire industry due, it is thought, to the silane only partially reacting with the filler surface. Consequently, the silane is only partially effective at dispersing the filler, e.g. silica, into the rubber matrix, especially early in the non-productive mixing step. The blocking group may also be only partially removed during the productive mixing step. Both good filler dispersion and good filler coupling to the rubber are required to achieve satisfactory end-use properties.

A process for preparing a rubber composition that uses thiocarboxyl-functional silane coupling and/or dispersion agent in rubber applications while still exhibiting the properties of low scorch and improved filler dispersion and coupling of the filler to the rubber matrix would therefore be highly desirable.

BRIEF DESCRIPTION OF THE INVENTION

In accordance with the present invention, a process is provided for preparing a rubber composition which comprises:
a) forming a mixture of
  (i) at least one thiocarboxyl-functional hydrolyzable silane,
  (ii) at least one rubber containing carbon-carbon double bonds,
  (iii) at least one silane-reactive filler,
  (iv) at least one activating agent, and
  (v) water;
b) subjecting the mixture provided in step (a) to reactive-mechanical-working conditions in the substantial absence of vulcanizing agent(s);
c) adding at least one vulcanizing agent (vi) to the composition of step (b);
d) mixing the composition of step (c) under non-reactive-mechanical-working conditions; and,
e) optionally, curing the rubber composition of step (d).

Employing the foregoing process, cured rubber articles of improved mechanical properties can be obtained. For example, in the case of the rubber components of a tire such as its tread and/or sidewall, the process of the invention provides a rubber composition that on curing provides increased reinforcing efficiency as represented by the reinforcing index, and increased resistance to abrasion and higher modulus at 300 percent elongation.

Other than in the working examples or where otherwise indicated, all numbers expressing amounts of materials, reaction conditions, time durations, quantified properties of materials, and so forth, stated in the specification and claims are to be understood as being modified in all instances by the term "about."

Each numerical range recited herein shall be understood to include all sub-ranges within that range.

Any compound, material or substance which is expressly or implicitly disclosed in the specification and/or recited in a claim as belonging to a group of structurally, compositionally and/or functionally related compounds, materials or substances shall be understood to include individual members of the group and all combinations thereof.

DETAILED DESCRIPTION OF THE INVENTION

It will be understood herein that all weight percents are based upon total weight percent of the rubber composition herein unless stated otherwise.

Thiocarboxyl-functional hydrolyzable silane (i) of step (a) preferably contains (1) a terminal thiocarboxyl group possessing a straight-chain alkyl dispersing group bonded to the carbon atom of the thiocarboxyl group, (2) a terminal hydrolyzable silyl group possessing at least one alkoxy group directly bonded to the silicon atom of the silyl group and (3) a divalent alkylene bridging, or linking, group bonding thiocarboxyl group (1) to silyl group (2). In one embodiment, the preferred thiocarboxyl-functional hydrolyzable silane (i) is represented by general Formula (1):

$$(R^1O)_{3-a}(CH_3)_aSi-R^2SC(=O)R^3 \qquad (1)$$

wherein:
each occurrence of $R^1$ is independently an alkyl group containing from 2 to 4 carbon atoms;
$R^2$ is a divalent alkylene group containing from 1 to 10 carbon atoms;
$R^3$ is an alkyl group containing from 5 to 9 carbon atoms; and,
a is 0 to 2.

As used herein in connection with thiocarboxyl-functional hydrolyzable silane (ii), "alkyl" is a monovalent saturated hydrocarbyl group and includes straight, branched and cyclic alkyl groups and "alkylene" is a divalent hydrocarbylene group and includes straight, branched and cyclic alkylene groups. Specific examples of alkyls include, but are not limited to ethyl, propyl, isopropyl, butyl, isobutyl, n-hexyl, 2-ethylhexyl, cyclohexyl, n-heptyl, octyl and n-nonyl. Specific examples of alkylene include, but are not limited to, methylene, ethylene, propylene and hexylene.

Thiocarboxyl-functional hydrolyzable silane (i) of the present invention reacts with the silane-reactive filler, disperses this filler into the rubber matrix without causing premature crosslinking of the rubber (often referred to as "scorch") and, finally, couples the silane-reactive filler to the rubber matrix through covalent bonds. The reactivity of the alkoxysilyl group with water or moisture is dependent upon the specific character of group $R^1$. It is generally preferred that $R^1$ be a straight chain alkyl group of from 2 to 4 carbon atoms and preferably an ethyl or n-propyl group. Once the thiocarboxyl-functional hydrolyzable silane has become bonded to the silane-reactive filler, it can then assist in the dispersion of the filler into the rubber matrix. Such dispersion is facilitated when $R^2$ is a straight chain alkylene group of from 3 to 6 carbon atoms and $R^3$ is a straight chain alkyl group of from 5 to 9 carbon atoms, and especially so when $R^2$ is n-propylene and $R^3$ is n-hexyl, n-heptyl or n-octyl. The combinations of straight chain and the sum of the number of carbon atoms in the $R^2$ and $R^3$ groups, preferably from 8 to 15 and more preferably 10 to 12, balance the ability of the silane to disperse the filler without causing scorch while maintaining sufficient reactivity to couple the silane-reactive filler to the rubber matrix.

Representative non-limiting examples of thiocarboxyl-functional hydrolyzable silane (i) include hexanethioic acid S-[2-(triethoxysilanyl)-methyl]ester; heptanethioic acid S-[2-(diethoxy-methyl-silanyl)-ethyl]ester; heptanethioic acid S-[2-(triethoxysilanyl)-ethyl]ester; heptanethioic acid S-[2-(tributoxysilanyl)-ethyl]ester; heptanethioic acid S-[3-(diethoxy-methyl-silanyl)-propyl]ester; heptanethioic acid S-[2-(triethoxysilanyl)-propyl]ester; octanethioic acid S-[3-(diethoxy-methyl-silanyl)-propyl]ester; octanethioic acid S-[3-(triethoxysilanyl)-propyl]ester; octanethioic acid S-[3-(triethoxysilanyl)-hexyl]ester; octanethioic acid S-[3-(ethoxy-dimethyl-silanyl)-propyl]ester; decanethioic acid S-[3-(diethoxy-methyl-silanyl)-propyl]ester; and, decanethioic acid S-[3-(triethoxysilanyl)-propyl]ester.

During process step (a), thiocarboxyl-functional hydrolyzable silane (i) bonds to silane-reactive filler (ii) through siloxane bonds (Si—O—Si) and/or oxysilyl metal bonds (Si—O-Metal) resulting from the hydrolysis of the alkoxysilyl functionality to provide silanol (Si—OH) groups which then undergo condensation with the surface silanol groups or surface metal hydroxyl groups (Metal-OH) of silane reactive filler (ii). Activating agent (iv) that is used in step (a) of the process facilitates the coupling reactions between silane-reactive filler (iii) and thiocarboxyl-functional hydrolyzable silane (i) by catalyzing both the hydrolysis of the alkoxysilyl group with water (v) and subsequent condensation with the silanol groups or metal hydroxyl groups of the filler as previously mentioned.

Rubber component(s) (ii) containing carbon-carbon double bonds can be an organic polymer selected to be at least one diene-based elastomer or rubber. Suitable rubber component(s) (ii) can be any of those well known in the art many of which are described in "The Vanderbilt Rubber Handbook", R. F. Ohm, ed.; R. T. Vanderbilt Company, Inc., Norwalk, Conn., 1990 and "Manual For The Rubber Industry", T. Kempermann, S. Koch, J. Sumner, eds.; Bayer A G, Leverkusen, Germany, 1993. Representative non-limiting examples of suitable rubber component(s) (ii) (organic polymers) include natural rubber (NR), synthetic polyisoprene (IR), polybutadiene (BR), various copolymers of butadiene, the various copolymers of isoprene and mixtures of these elastomers; solution styrene-butadiene rubber (SSBR), emulsion styrene-butadiene rubber (ESBR), ethylene-propylene terpolymers (EPDM) and acrylonitrile-butadiene rubber (NBR).

In one embodiment herein, rubber component (ii) is comprised of at least one diene-based elastomer or rubber. In an even more specific embodiment, suitable monomers for preparing the rubbers are conjugated dienes such as the non-limiting examples of isoprene and 1,3-butadiene, and suitable vinyl aromatic compounds such as the non-limiting examples of styrene and alpha methyl styrene, and combinations thereof In a particular embodiment, rubber component (ii) is a sulfur-curable rubber. In a further embodiment, the diene based elastomer, or rubber, can be selected from the non-limiting examples of at least one of cis-1,4-polyisoprene rubber (natural and/or synthetic), and preferably natural rubber, emulsion polymerization-prepared styrene/butadiene copolymer rubber, organic solution polymerization-prepared styrene/butadiene rubber, 3,4-polyisoprene rubber, isoprene/butadiene rubber, styrene/isoprene/butadiene terpolymer rubber, cis-1,4-polybutadiene, medium vinyl polybutadiene rubber (35-50 percent vinyl), high vinyl polybutadiene rubber (50-75 percent vinyl), styrene/isoprene copolymers, emulsion polymerization-prepared styrene/butadiene/acrylonitrile terpolymer rubber and butadiene/acrylonitrile copolymer rubber. An emulsion polymerization-derived styrene/butadiene rubber (ESBR) is also contemplated as the diene-based rubber for use herein such as one having a relatively low to medium styrene content of from 20 to 29 weight percent or, for some applications, an ESBR having a medium to relatively high styrene content, in particular, a styrene content of from 30 to 45 weight percent. In an even further specific embodiment, emulsion polymerization-derived styrene/butadiene/acrylonitrile rubber containing from 2 to 40 weight percent bound acrylonitrile is also contemplated as diene-based rubber for use herein.

In another embodiment herein, the organic solution polymerization-prepared SBR (SSBR) typically has a bound styrene content in a range of from 5 to 50, preferably from 9 to 36 bound styrene and more preferably from 20 to 30 weight percent bound styrene. In a more specific embodiment, polybutadiene elastomer can be conveniently characterized, for example, by having at least 90 weight percent cis-1,4-content.

In still another embodiment herein, rubber component (ii) is a diene polymer functionalized or modified by an alkoxysilane derivative. Silane-functionalized organic solution polymerization-prepared styrene-butadiene rubber and silane-functionalized organic solution polymerization-prepared 1,4-polybutadiene rubbers may be used. These rubber compositions are known; see, for example, U.S. Pat. No. 5,821,290 the entire contents of which are incorporated by reference herein.

In yet another embodiment herein, rubber component (ii) is a diene polymer functionalized or modified by a tin derivative. Tin-coupled copolymers of styrene and butadiene may be prepared, for example, by introducing a tin coupling agent during the styrene and 1,3-butadiene monomer copolymerization reaction in an organic solvent solution, usually at or near the end of the polymerization reaction. Such tin-coupled styrene-butadiene rubbers are well known to those skilled in the art; see, for example, U.S. Pat. No. 5,268,439, the entire contents of which are incorporated by reference herein. In practice, at least 50 percent, and preferably from 60 to 85 percent, of the tin is bonded to the butadiene units of the styrene-butadiene rubbers to create a tin-dienyl bond.

In still yet another embodiment, rubber component (ii) is selected from the group consisting of solution styrene-butadiene rubber, emulsion styrene-butadiene rubber and polybutadiene.

The expression "silane-reactive filler" shall be understood herein to mean a substance that is capable of reaction with thiocarboxyl-functional hydrolyzable silane (i) to form stable Si—O-filler bonds. Silane-reactive filler (iii) includes a substance that is added to rubber component (ii) to reinforce the elastomeric network. Reinforcing fillers are materials whose moduli are higher than rubber component(s) (ii) of the rubber composition resulting from step (a) and are capable of absorbing stress from rubber component(s) (ii) when this component is strained. In one embodiment, silane-reactive filler (iii) includes fibers, particulates and sheet-like structures and can be composed of inorganic minerals, silicates, silica, clays, ceramics and diatomaceous earth. Silane-reactive filler (iii) can be a discrete particle or group of particles in the form of aggregates or agglomerates.

Silane-reactive filler (iii) includes fillers in which the thiocarboxyl-functional hydrolyzable silane (i) is reactive with the surface of the filler. Particulate precipitated silica is useful as silane-reactive filler (iii), particularly when the silica has reactive surface silanols. Silane-reactive filler (iii) may be provided in a hydrated form or be converted to a hydrated form by reaction with at least part of water (v).

Some representative non-limiting examples of suitable silane-reactive filler (iii) materials include at least one metal oxide such as silica (pyrogenic and/or precipitated), titanium dioxide, aluminosilicate, alumina and siliceous materials including clays and talc.

In a specific embodiment herein, silane-reactive filler (iii) is a silica used alone or in combination with one or more other fillers, e.g., organic and/or inorganic fillers that do not react with thiocarboxyl-functional hydrolyzable silane (i). A representative non-limiting example is the combination of silica and carbon black, such as for reinforcing fillers for various rubber products, including the non-limiting example of treads for tires. Alumina can be used either alone or in combination with silica. The term "alumina" herein refers to aluminum oxide, or $Al_2O_3$. Use of alumina in rubber compositions is known; see, for example, U.S. Pat. No. 5,116,886 and EP 631 982, the entire contents of both of which are incorporated by reference herein.

Silane-reactive filler (iii) herein can be used as a carrier for liquid silanes and reinforcing fillers for elastomers in which thiocarbonyl-functional hydrolyzable silane (i) herein is capable of reacting or bonding with the surface.

Other fillers that can be used as carriers are non-reactive with silane (i). The non-reactive nature of the fillers is demonstrated by the ability of silane (i) to be extracted at greater than 50 percent of the loaded silane using an organic solvent. The extraction procedure is described in U.S. Pat. No. 6,005,027, the entire contents of which are incorporated by reference herein. Representative of non-reactive carriers include, but are not limited to, porous organic polymers, carbon black, diatomaceous earth and silicas that are characterized by a relatively low differential of less than 1.3 between the infrared absorbance at 3502 $cm^{-1}$ of the silica when taken at 105° C. and when taken at 500° C. as described in U.S. Pat. No. 6,005,027. The amount of silane (i) that can be loaded on the carrier is specifically between 0.1 and 70 percent and more specifically between 10 and 50 percent.

In one non-limiting embodiment herein, the other fillers that may be mixed with silane-reactive filler (iii) can be essentially inert to the thioicarboxyl-functional hydrolyzable silane (i) with which they are admixed as is the case with carbon black or organic polymers, or at least two silane-reactive fillers can be mixed together and can be reactive therewith, e.g., the case with carriers possessing metal hydroxyl surface functionality, e.g., silicas and other siliceous particulates which possess surface silanol functionality, in combination with reinforcing fillers containing metal hydroxyl surface functionality, e.g., alumina, silicas and other siliceous fillers.

In one embodiment herein, precipitated silica is utilized as silane-reactive filler (iii). In a more specific embodiment, silica filler (iii) herein can be characterized by having a Brunauer, Emmett and Teller (BET) surface area, as measured using nitrogen gas, in the range of from 40 to 600 $m^2/g$, preferably in the range of from 50 to 300 $m^2/g$ and more preferably in the range of from 100 to 150 $m^2/g$. The BET method of measuring surface area, described in the *Journal of the American Chemical Society*, Volume 60, page 304 (1930), is the method used herein. In yet another specific embodiment, the silica is typically characterized by having a dibutylphthalate (DBP) absorption value in a range of from 100 to 350, preferably from 150 to 300 and more preferably from 200 to 250. In even further specific embodiments, silane-reactive filler (iii), as well as the aforesaid alumina and aluminosilicate fillers, possess a CTAB surface area in the range of from 100 to 220 $m^2/g$. CTAB surface area is the external surface area as determined by cetyl trimethylammonium bromide with a pH of 9; the method for its measurement is described in ASTM D 3849.

Mercury porosity surface area is the specific surface area determined by mercury porosimetry. In this technique, mercury is penetrated into the pores of the sample after a thermal treatment to remove volatiles. In a more specific embodiment, set-up conditions use a 100 mg sample, remove volatiles over 2 hours at 105° C. and ambient atmospheric pressure and employ a measuring range of from ambient to 2000 bars pressure. Such evaluations can be performed according to the method described in Winslow, et al. in ASTM bulletin, p. 39 (1959) or according to DIN 66133; for such an evaluation, a CARLO-ERBA Porosimeter 2000 can be used. Particularly useful silane-reactive filler (iii), e.g., silica, has an average mercury porosity specific surface area in a range of from 100 to 300 $m^2/g$, preferably from 150 to 275 $m^2/g$ and more preferably from 200 to 250 $m^2/g$.

A suitable pore size distribution for silane-reactive filler (iii), e.g. the non-limiting examples of silica, alumina and aluminosilicate, according to such mercury porosity evaluation is considered herein to be: five percent or less of its pores having a diameter of less than 10 nm; from 60 to 90 percent of its pores having a diameter of from 10 to 100 nm; from 10 to 30 percent of its pores having a diameter of from 100 to 1,000 nm; and, from 5 to 20 percent of its pores having a diameter of greater than 1,000 nm. The silane-reactive filler (b), e.g., silica, can normally be expected to have an average ultimate particle size in the range of from 0.01 to 0.05 μm as determined by electron microscopy, although the particles can be smaller or larger in average size. Various commercially available silicas can be used herein such as those available from PPG Industries under the HI-SIL trademark, in particular, HI-SIL 210, and 243; silicas available from Rhone-Poulenc, e.g., ZEOSIL 1165MP; silicas available from Degussa, e.g., VN2 and VN3, etc., and silicas available from Huber, e.g., HUBERSIL 8745.

In one embodiment, silane-reactive filler (iii) can comprise from 15 to 95 weight percent precipitated silica, alumina and/or aluminosilicate and, correspondingly, from 5 to 85 weight percent carbon black having a CTAB value in a range of from 80 to 150. In another embodiment, silane-reactive filler (iii) can comprise from 60 to 95 weight percent of said silica, alumina and/or aluminosilicate and, correspondingly, from 40 to 5 weight percent of carbon black. In yet another specific embodiment, the siliceous filler and carbon black can be pre-blended or blended together during the manufacture of the vulcanized rubber.

Activating agent (iv) is advantageously selected from among strong organic bases containing the guanidine-functional group, (—)$_2$N—C(=N—)—N(—)$_2$. The guanidine-containing strong base assists in the removal of a hydronium ion from water to catalyze the hydrolysis reaction and the removal of a hydronium ion from the resulting silanol to catalyze the condensation reaction with the surface of the silane-reactive filler. A preferred class of guanidine containing strong bases is represented by general Formula (2):

$$R^4R^5N\text{—}C(=NR^6)\text{—}NR^7R^8 \quad (2)$$

wherein each occurrence of $R^4$, $R^5$, $R^6$, $R^7$ and $R^8$ is independently hydrogen or a monovalent hydrocarbyl selected from the group consisting of alkyl, aryl, aralkyl and arenyl containing from 1 to 10 carbon atoms. In one specific embodiment, each $R^4$, $R^6$ and $R^8$ is hydrogen and each $R^5$ and $R^7$ is a monovalent hydrocarbyl selected from alkyl or aryl containing up to 6 carbon atoms.

Representative non-limiting examples of activating agent (iv) include 1,3-dimethyl guanidine; 1,3-diethyl-guanidine; 1-methyl-3-phenyl guanidine; 1,3-diphenyl guanidine; 1,1,3,3-tetramethyl guanidine; 1,1,3,3-tetraphenyl guanidine; 1,1,3,3-tetrabuyl guanidine and 1,3-di-o-tolylguanidine. Particularly useful activating agents (iv) are 1,3-diphenyl guanidine and 1,3-di-o-tolylguanidine.

Water (v) reacts with thiocarboxyl-functional hydrolyzable silane (i) to form silanol groups, which are reactive with the silane-reactive filler (iii). Water can be added to the rubber composition as a hydrate or in liquid, solid or gaseous form. The preferred method for adding the water is to hydrate silane-reactive filler (iii) with water. The water content of the hydrated silane-reactive filler (iii) can range from 0.5 to 15 weight percent, preferably from 2 to 10 weight percent and more preferably from 4 to 6 weight percent water (v) based on the total weight of the hydrated silane-reactive filler.

Vulcanization can be conducted in the presence of vulcanizing agent (vi) which reacts with the rubber containing carbon-carbon double bonds (ii) to form a crosslinked, or cured, rubber. Some non-limiting examples of suitable sulfur vulcanizing agents (vi) include, e.g., elemental sulfur (free sulfur) or sulfur-donating compound such as the non-limiting examples of amino disulfide, polymeric polysulfide or sulfur-olefin adducts. These and other known and conventional vulcanizing agents are added in the usual amounts step (c) of the process herein.

The process herein involves the mixing of components (i), (ii), (iii), (iv), (v) and (vi), as disclosed above, in effective amounts. In one embodiment, an effective amount of thiocarboxyl-functional hydrolyzable silane (i) can range from 0.2 to 20, preferably from 0.5 to 15 and more preferably from 2 to 10, weight percent based on the total weight of rubber composition. An effective amount of rubber component (ii) can range from 30 to 98, preferably from 50 to 95 and more preferably from 60 to 80, weight percent based on the total weight of the rubber composition. An effective amount of silane-reactive filler (iii) can range from 2 to 70, preferably from 5 to 50 and more preferably from 20 to 40, weight percent based on the total weight of rubber composition. An effective amount of activating agent (iv) can range from 0.2 to 5 weight percent, preferably from 0.5 to 3 weight percent and more preferably from 1 to 2, weight percent based on the total weight of the rubber composition. An effective amount of water (v) can range from 0.1 to 15, preferably from 0.5 to 5 and more preferably from 1 to 3, weight percent based on the total weight of the rubber composition. An effective amount of vulcanizing agent (vi) can range from 0.2 to 5, preferably from 0.5 to 2.5 and more preferably from 1 to about 2, weight percent based on the total weight of the rubber composition.

In another embodiment herein, the process for preparing a rubber composition can optionally comprise curing the rubber composition, before, during and/or after molding the rubber composition. A vulcanized rubber composition should contain a sufficient amount of silane-reactive filler (iii) to contribute a reasonably high modulus and high resistance to tear thereto. The combined weight of silane-reactive filler (iii) can be as low as 5 to 100 parts per hundred parts of rubber (phr) component (ii), and preferably ranged from 25 to 85 phr, and more preferably from 50 to 70 phr.

In one embodiment, the thiocarboxyl-functional hydrolyzable silane (i) can be premixed with particles, aggregates and/or agglomerates of silane-reactive filler (iii) or added to the rubber mix during the processing or mixing of rubber (ii) and silane-reactive filler (iii). In another embodiment, the thiocarboxyl-functional hydrolyzable silane (i) and silane-reactive filler (iii) are added separately to the process mixture containing rubber component (ii). Silane-reactive filler (iii) and thiocarboxyl-functional hydrolyzable silane (i) can be considered to couple or react in situ to form a silane-reactive filler in which the silane is chemically bonded to the filler.

Components (i) to (v) in step (a) are mixed under reactive-mechanical-working conditions. As used herein, the expression "reactive-mechanical-working conditions" shall be understood to mean the conditions of elevated temperature, residence time and shear prevailing within a mechanical-working apparatus, such as an extruder, intermeshing mixer, or tangential mixer, such conditions being sufficient to bring about one or more of the following:

a) the reactive process of hydrolysis of thiocarboxyl-functional hydrolyzable silane (i) with water (v) to form thiocarboxyl-functional silanols in the presence of activating agent (iv);
b) the reactive process of these silanols with silane-reactive filler (iii) to form covalent chemical bonds with the filler (iii) in the presence of activating agent (iv);
c) the breakdown of silane-reactive filler (iii) agglomerates into smaller aggregates and/or individual filler particles; and,
d) the dispersion into the rubber component (ii) of silane-reactive filler (iii) covalently bonded to hydrolyzed and subsequently condensed thiocarboxyl-functional hydrolyzable silane.

The rubber composition is typically mixed in a mixing apparatus under high shear conditions where it autogenously heats up as a result of the mixing, primarily due to shear and associated friction occurring within the rubber mixture.

In a more specific embodiment, the mixture of the desired amounts of thiocarboxyl-functional hydrolyzable silane (i), rubber component (ii), silane-reactive filler (iii), activating agent (iv) and water (v) of step (a) is blended under reactive-mechanical-working conditions in mixing step (b) carried out on a continuous or non-continuous basis. Non-continuous mixing can be employed where a build-up of excessive heat might occur and the rubber composition may need to be cooled. Cooling of the rubber will avoid or minimize thermal decomposition of rubber component(s) (ii) or other components in the rubber composition. In a more specific embodiment, mixing step (b) is conducted at temperatures from 100° C. to 200° C. and preferably from 140° C. to 180° C.

In step (c), at least one vulcanizing agent (vi) is mixed with the rubber composition from step (b). Mixing is accomplished under non-reactive-mechanical-working conditions. As used herein, the expression "non-reactive-mechanical-working" conditions shall be understood to mean the conditions of sub-ambient, ambient or slightly elevated temperature, residence time and shear prevailing within a mechanical-working apparatus, such as an extruder, intermeshing mixer, tangential mixer, or roll mill, such conditions being sufficient to bring about dispersion of the vulcanizing agent into the rubber composition of step (c) without resulting in any appreciable vulcanization of the rubber composition. Low temperatures and low shear are typically employed in step (d).

The temperature employed in step (d) can range from 5° C. to 130° C., preferably from 30° C. to 100° C. and more preferably from 50° C. to 75° C., such temperatures being lower than those utilized for reactive-mechanical-working conditions in order to prevent or inhibit premature curing of the sulfur-curable rubber, sometimes referred to as scorching of the rubber composition, which might take place at higher temperatures. Residence time can considerably and is generally chosen to complete the dispersion of the vulcanizing agent. Residence times in most cases can range from 0.5 to 30 minutes and preferably from 5 to 20 minutes.

The rubber composition may be allowed to cool, e.g., during or after step (d) or, between step (b) and step (d), to a temperature of 50° C. or less.

In another embodiment herein, when it is desired to mold and to cure the rubber composition, the rubber composition is placed in the desired mold and heated to at least about 130° C. and up to about 200° C. for a time of from 1 to 60 minutes to bring about the vulcanization of the rubber.

The rubber composition can be compounded with other commonly used additive materials such as, e.g., retarders and accelerators, processing additives such as oils, resins such as tackifying resins, plasticizers, pigments, fatty acid, zinc oxide, waxes, antioxidants and antiozonants, peptizing agents, and the like. Depending on the intended use of the rubber composition, these and/or other rubber additives are used in conventional amounts.

Vulcanization accelerators, i.e., additional sulfur donors, can also be used if desired. Non-limiting examples of vulcanization accelerators include benzothiazole, alkyl thiuram disulfide, guanidine derivatives and thiocarbamates. Other examples of such accelerators include, but are not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropylbenzothiozole-2-sulfenamide, zinc-2-mercaptotoluimidazole, dithiobis(N-methylpiperazine), dithiobis(N-beta-hydroxy ethyl piperazine) and dithiobis(dibenzyl amine). In another embodiment, other additional sulfur donors include, e.g., thiuram and morpholine derivatives. In a more specific embodiment, representative of such donors include, e.g., but are not limited to, dimorpholine disulfide, dimorpholine tetrasulfide, tetramethyl thiuram tetrasulfide, benzothiazyl-2,N-dithiomorpholide, thioplasts, dipentamethylenethiuram hexasulfide, disulfidecaprolactam.

Accelerators may be used to control the time and/or temperature required for vulcanization and to improve the properties of the vulcanizate. In one embodiment, a single accelerator system can be used, i.e., a primary accelerator. In another embodiment, conventionally and more specifically, a primary accelerator(s) is used in total amounts ranging from 0.5 to 4, and preferably from 0.8 to 1.5, phr. In a more specific embodiment, combinations of a primary and a secondary accelerator can be used with the secondary accelerator being used in smaller amounts, e.g., from 0.05 to 3 phr in order to activate and to improve the properties of the vulcanizate. In yet another embodiment, delayed action accelerators can also be used. In still another embodiment, vulcanization retarders can also be used. Suitable types of accelerators are those such as the non-limiting examples of amines, disulfides, guanidines, thioureas, thiazoles, thiurams, sulfenamides, dithiocarbamates, xanthates and combinations thereof. In a particular embodiment, the primary accelerator is a sulfenamide. In another embodiment, if a second accelerator is used, the secondary accelerator can be a guanidine, dithiocarbamate or thiuram compound.

Optional tackifier resins can be used at levels of from 0.5 to 10 phr and usually from 1 to 5 phr. In one specific embodiment, typical amounts of processing aids range from 1 to 50 phr. Suitable processing aids can include, as non-limiting examples, aromatic, naphthenic and/or paraffinic processing oils and combinations thereof. In yet another specific embodiment, typical amounts of antioxidants are from 1 to 5 phr. Representative antioxidants include, as non-limiting examples, diphenyl-p-phenylenediamine and others, e.g., those disclosed in the Vanderbilt Rubber Handbook (1978), pages 344-346. In yet another embodiment, typical amounts of antiozonants range from 1 to 5 phr. Typical amounts of optional fatty acids, which can include the non-limiting example of stearic acid, range from 0.5 to 3 phr. Typical amounts of zinc oxide range from 2 to 5 phr. Typical amounts of waxes, e.g., microcrystalline wax, range from 1 to 5 phr. Typical amounts of peptizers range from 0.1 to 1 phr. Suitable peptizers include, as non-limiting examples, pentachlorothiophenol, dibenzamidodiphenyl disulfide and combinations thereof.

The rubber composition herein can be used for various purposes. In one specific embodiment herein, there is provided an article of which at least one component is the herein described cured rubber composition. In another specific embodiment herein, there is provided a tire at least one component of which, e.g., the tread, is the herein described cured rubber composition. In yet another specific embodiment, for example, the rubber composition herein can be used for the manufacture of such articles as shoe soles, hoses, seals, cable jackets, gaskets and other industrial goods. Such articles can be built, shaped, molded and cured by various known and conventional methods as is readily apparent to those skilled in the art.

EXAMPLES 2, 3, 4 AND 7; COMPARATIVE EXAMPLES 1, 5 AND 6

A. Components of the Rubber Compositions of the Examples

In the rubber compositions of the examples herein, all amounts of components are in parts by weight.

The thiocarboxyl-functional hydrolyzable silane used in the examples is octanethioic acid S-[3-(triethoxysilanyl)-propyl] ester, commercially obtained from Momentive Performance Materials under the trade name Silquest NXT silane (hereinafter, "NXT silane").

In the rubber compositions of the examples, the amounts of reactants are given in parts per hundred of rubber (phr) unless otherwise indicated. Masterbatch Formulation:75 SSBR (12% styrene, 46% vinyl, $T_g$:42° C.), 25 BR (98% cis, $T_g$:104° C.), 80 ZEOSIL 1165MP Silica, 32.5 Sundex 8125 aromatic process oil, 2.5 KADOX 720C Zinc oxide, 1 INDUSTRENE Stearic acid, 2 SANTOFLEX 6-PPD, 1.5 M-4067 Microcrystalline wax, 3 N330 carbon black and 8.2 NXT silane. Examples 2, 3 and 4 and Comparative Examples 1 and 5 used the same masterbatch formulation except for the differences indicated in Table 1. Comparative Example 1 was run as a control with a conventional cure package: 1.4 sulfur, 1.7 CBS and 2.0 DPG (diphenyl guanidine activating agent). For Example 2, one phr DPG was added in the non-productive mixing step and one phr DPG was used in the vulcanization step; overall 2 phr DPG were used. For Example 3, one phr DPG was used in the non-productive mixing while normal two phr DPG were added in the vulcanization stage. Example 4 is the same as Example 3 except 0.3 phr more sulfur were used in the vulcanization stage. Comparative Example 5 is the same as control Comparative Example 1 except 0.3 more phr sulfur was used in the vulcanization step.

B. General Procedure for Preparing the Rubber Compositions of the Examples and Vulcanizing Same The mixing of the rubber masterbatch was carried out in a Krupp mixer with a 1550 cc chamber volume. The mixer was turned on with the mixer at 30 rpm and the cooling water on full. The rubber polymers were added to the mixer and ram down mixed for 60 seconds. Half of the silica and all of the silane with approximately 35-40 grams of this portion of silica in an ethylvinyl acetate (EVA) bag were added and ram down mixed for 60 seconds. The remaining silica, together with "promoter" and the processing oil in an EVA bag were then added and ram down mixed for 90 seconds. The mixer throat was dusted down and the mixture ram down mixed for 30 seconds. The remaining components were then added and ram down mixed for 60 seconds. The mixer throat was again dusted down and the mixture ram down mixed for 30 seconds. The mixer's mixing speed was increased to 95 rpm, as required to raise the temperature of the rubber masterbatch to between 165° and 170° C. The rubber masterbatch was mixed for eight minutes, and the speed of the Krupp mixer was adjusted to maintain the temperature between 165° and 170° C. The masterbatch was removed from the mixer, a sheet was formed from the masterbatch on a roll mill set at about 50° to 60° C. and then allowed to cool to ambient temperature.

The rubber masterbatch and the curatives were mixed on a 6 in.×13 in. (15 cm×33 cm) two roll mill heated to between 50° and 60° C. The sulfur and accelerators were added to the rubber masterbatch and thoroughly mixed on the roll mill and allowed to form a sheet. The sheet was cooled to ambient conditions for 24 hours before curing. The rheological properties were measured on a Monsanto R-100 Oscillating Disk Rheometer and a Monsanto M1400 Mooney Viscometer. The cured rubber specimens for measuring the mechanical properties were cut from 6 mm plaques cured for t90 at 149° C.

The following tests were conducted with the following methods (in all examples): Mooney Scorch @ 135° C. (ASTM Procedure D1646); Mooney Viscosity @ 100° C. (ASTM Procedure D1646); Oscillating Disc Rheometer (ODR) @ 149° C., 1° arc, (ASTM Procedure D2084); Physical Properties, cured t90 @ 149° C. (ASTM Procedures D412 and D224) (G' and G" in dynes/cm$^2$).

The cured rubber composition of Examples 2, 3 and 4 and Comparative Examples 1 and 5, their Mooney and Rheometer properties and their physical an dynamic properties are presented below in Tables 1, 2 and 3.

TABLE 1

Rubber Compositions of Examples 2, 3 and 4 and Comparative Examples 1 and 5

| Component | Comp. Ex. 1 | Ex. 2 | Ex. 3 | Ex. 4 | Comp. Ex. 5 |
|---|---|---|---|---|---|
| Silane | NXT | NXT | NXT | NXT | NXT |
| Silane phr | 8.2 | 8.2 | 8.2 | 8.2 | 8.2 |
| DPG in NP mixing (phr) | | 1.0 | 1.0 | 1.0 | |
| Vulcanization Package | | | | | |
| Sulfur (phr) | 1.4 | 1.4 | 1.4 | 1.7 | 1.7 |
| CBS (phr) | 1.7 | 1.7 | 1.7 | 1.7 | 1.7 |
| DPG (phr) | 2.0 | 1.0 | 2.0 | 2.0 | 2.0 |

TABLE 2

Mooney and Rheometer Properties of Cured Rubber Compositions of of Examples 2, 3 and 4 and Comparative Examples 1 and 5

| | Comp. Ex. 1 | Ex. 2 | Ex. 3 | Ex. 4 | Comp. Ex. 5 |
|---|---|---|---|---|---|
| Mooney Properties | | | | | |
| Viscosity at 100° C. (ML1 + 4) | 100 | 105 | 103 | 102 | 99 |
| MV at 135° C. (MS1+) | 100 | 103 | 100 | 100 | 103 |
| Scorch at 135° C. (MS1 + $t_3$) (min) | 100 | 97 | 58 | 58 | 93 |
| Cure at 135° C. (MS1 + $t_{18}$) (min) | 100 | 104 | 67 | 63 | 94 |
| Rheometer (ODR) Properties, (1° arc at 149° C.) | | | | | |
| $M_L$ (dN-m) | 100 | 109 | 111 | 112 | 92 |
| $M_H$ (dN-m) (30 min. timer) | 100 | 103 | 104 | 111 | 105 |
| MH - ML | 100 | 99 | 101 | 110 | 112 |
| T90 (min) (30 min. timer) | 100 | 105 | 89 | 88 | 100 |
| $T_{s1}$ (min) | 100 | 105 | 71 | 68 | 89 |

TABLE 3

Physical and Dynamic Properties for Cured Rubber Compositions of Examples 2, 3 and 4 and Comparative Examples 1 and 5

| | Comp. Ex. 1 | Ex. 2 | Ex. 3 | Ex. 4 | Comp. Ex. 5 |
|---|---|---|---|---|---|
| Physical Properties (cured t90 at 149° C.) | | | | | |
| Hardness (Shore A) | 100 | 100 | 98 | 100 | 100 |
| Tensile (MPa) | 100 | 98 | 101 | 103 | 101 |
| Elongation (%) | 100 | 89 | 88 | 84 | 90 |
| 25% Mod (MPa) | 100 | 93 | 93 | 95 | 106 |
| 100% Mod (MPa) | 100 | 99 | 105 | 112 | 126 |
| 300% mod (MPa) | 100 | 109 | 119 | 135 | 123 |
| RI (300%/25%) | 100 | 118 | 128 | 143 | 116 |
| RI (300%/100%) | 100 | 110 | 113 | 121 | 99 |
| Non-linearity (0-10%) 60° C. | | | | | |
| $G'_{initial}$ (MPa) | 100 | 91 | 80 | 87 | 99 |
| ΔG' (MPa) | 100 | 78 | 69 | 77 | 95 |

TABLE 3-continued

Physical and Dynamic Properties for Cured Rubber Compositions of Examples 2, 3 and 4 and Comparative Examples 1 and 5

|  | Comp. Ex. 1 | Ex. 2 | Ex. 3 | Ex. 4 | Comp. Ex. 5 |
|---|---|---|---|---|---|
| $G''_{max}$ (MPa) | 100 | 94 | 75 | 77 | 92 |
| $Tan\delta_{max}$ | 100 | 93 | 93 | 89 | 87 |
| Temperature Dependence | | | | | |
| $Tan\delta$ 0° C. | 100 | 104 | 105 | 107 | 105 |
| $Tan\delta$ 60° C. | 100 | 93 | 92 | 90 | 93 |

When DPG was used in the non-productive mixing step, at the same total DPG loading level (Comparative Example 1 compared with Example 2), the reinforcement index (300%/100% modulus) was increased 10% and the silica dispersion was improved (as delta G' decreased from 100 in Comparative Example 1 to 78 in Example 2 in Table 3), while other properties were similar.

In the case where extra DPG was added in the non-productive mixing step (Example 4), the increased sulfur (1.7 phr sulfur in Example 4) resulted in a greater reinforcement index (121 for Example 4 as shown) compared to Comparative Example 5 where no DPG was added in the non-productive but with the same sulfur loading.

EXAMPLE 7 and COMPARATIVE EXAMPLE 6

Volatile organic compound (VOC) measurement in a Banbury mixer was carried out to demonstrate the improved efficiency of the silane/silica reactions herein by using DPG as the promoter in the non-productive mixing step. The amount of ethanol released was measured and used as the indicator of how much NXT silane reacted with silica during the process.

A typical procedure for measuring VOC's from a Banbury mixer (1.5 liter) will now be described. Through proper venting of all emissions that evolve during rubber mixing, the exhaust gases including VOC's in vapor phase are suctioned out from the exhaust stream using an appropriate air sampler such as Gilian BDX Abatement Air Sampler. Typical exhaust pipes used with a Banbury mixer are about 10 inch diameter with an approximate flow rate of 100 cu. ft/min. The VOC's are adsorbed onto charcoal tubes, which are then analyzed to quantify the VOC content in the exhaust stream. Since only a small fraction of the total exhaust stream is withdrawn during this measurement, a known amount of a control VOC, e.g., isopropanol, is also injected into the exhaust stream. The amount of isopropanol injected relative to the amount measured on charcoal tubes provides the multiplying factor for the ethanol detected in order to determine the total ethanol evolved in the exhaust stream.

The same formulation and one pass procedure (as described in Comparative Example 1 and Example 2 above) were used in the non-productive mixing step for the VOC measurements. Results are listed in Table 2 for comparison: Comparative Example 6 was run as a control and Example 7 illustrating the invention was run with one phr DPG added in the mixing step. The results clearly indicate that more ethanol was released for NXT silane when DPG was used as a promoter in the non-productive mixing stage.

TABLE 2

Ethanol Emission Comparison Between Examples 6 and 7

| Emissions Data | Comp. Ex. 6 | Ex. 7 |
|---|---|---|
| NXT silane (phr) | 8.2 | 8.2 |
| DPG in non-productive NP mixing (phr) | None | 1.0 |
| Measured ethanol emission (grams) | 4.74 | 5.94 |
| Recovery rate of theoretical ethanol emission | 38.5% | 48.3% |

The rubber composition of this invention is particularly advantageous for use in the manufacture of tire treads exhibiting low rolling resistance and high wear resistance, especially when the treads are based on emulsion or solution styrene-butadiene rubber.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

The invention claimed is:

1. A process for preparing a rubber composition which comprises:
   a) providing a mixture of:
      (i) at least one thiocarboxyl-functional hydrolyzable silane having the general formula:

$(R^1O)_{3-a}(CH_3)_a Si-R^2SC(=O)R^3$ wherein:
         each occurrence of $R^1$ is independently an alkyl group containing from 2 to 4 carbon atoms;
         $R^2$ is a divalent alkylene group containing from 1 to 10 carbon atoms;
         $R^3$ is an alkyl group containing from 5 to 9 carbon atoms; and,
         a is 0 to 2, and in the amount of from 0.2 to 20 weight percent, based on the total weight of the rubber composition;
      (ii) at least one rubber containing carbon-carbon double bonds selected from the group consisting of polybutadiene rubber, emulsion polymerization-prepared styrene/butadiene copolymer rubber, organic solution polymerization-prepared styrene/butadiene rubber, in the amount of from 30 to 98 weight percent, based on the total weight of the rubber composition;
      (iii) at least one silane-reactive filler having a BET surface area between 100 m²/g and 600 m²/g in the amount of from 2 to 70 weight percent, based on the total weight of the rubber composition;
      (iv) at least one activating agent, wherein said activating agent (v) is at least one guanidine-containing base of the general formula:

wherein each occurrence of $R^4$, $R^5$, $R^6$, $R^7$ and $R^8$ is independently hydrogen or a monovalent hydrocarbyl selected from the group consisting of alkyl, aryl, aralkyl and arenyl containing from 1 to 10 carbon atoms in the amount of from 0.2 to 5 weight percent, based on the total weight of the rubber composition; and (v) water, wherein said water (v) is added in an amount of from 2 to 6 weight percent to the silane-reactive filler (iii) to form a hydrated silane-reactive filler, where the amount is based on the total weight of the hydrated silane-reactive filler, wherein said thiocarboxyl-functional hydrolyzable silane is added to the rubber mix during the mixing of the rubber (ii);
b) subjecting the mixture provided in step (a) to reactive-mechanical-working conditions in the substantial absence of vulcanizing agent(s), wherein said reactive-mechanical-working conditions are an elevated temperature of from 140° C. to 180° C., residence times and shear prevailing with a mechanical-working apparatus selected from the group consisting of an extruder, intermeshing mixer, and tangential mixer;
c) cooling the mixture of step (b) to a temperature of 50° C. or less;
d) adding at least one vulcanizing agent (vi) in the amount of from 0.2 to 5 weight percent, based on the total weight of the rubber composition to the composition of step (c) and a combination of at least one primary accelerator used in the amount of from 0.5 to 4 parts by weight per hundred parts rubber and at least one secondary accelerator used in the amount of from 0.05 to 3 parts by weight per hundred parts of rubber;
e) mixing the composition of step (d) under non-reactive-mechanical-working conditions, wherein said non-reactive-mechanical-working conditions comprises a temperature of from 30° C. to 100° C. and a residence time of from 0.5 to 30 minutes; and
f) optionally, curing the rubber composition of step (e) at a temperature of from 130° up to 200° C.

2. The process of claim 1 wherein $R^1$ is a straight chain alkyl of 2 to 4 carbon atoms, $R^2$ is a straight chain alkylene of from 3 to 6 carbon atoms and $R^3$ is a straight chain alkyl of from 5 to 9 carbon atoms.

3. The process of claim 2 wherein $R^1$ is an ethyl or n-propyl, $R^2$ is n-propylene and $R^3$ is n-hexyl, n-heptyl or n-octyl.

4. The process of claim 1 wherein thiocarboxyl-functional hydrolysable silane (i) is at least one member selected from the group consisting of hexanethioic acid S-[2-(triethoxysilanyl)-methyl]ester; heptanethioic acid S-[2-(diethoxy-methyl-silanyl)-ethyl]ester; heptanethioic acid S-[2-(triethoxysilanyl)-ethyl]ester; heptanethioic acid S-[2-(tributoxysilanyl)-ethyl]ester; heptanethioic acid S-[3-(diethoxy-methyl-silanyl)-propyl]ester; heptanethioic acid S-[2-(triethoxysilanyl)-propyl]ester; octanethioic acid S-[3-(diethoxy-methyl-silanyl)-propyl]ester; octanethioic acid S-[3-(triethoxysilanyl)-propyl]ester; octanethioic acid S-[3-(triethoxysilanyl)-hexyl]ester; octanethioic acid S-[3-(ethoxy-dimethyl-silanyl)-propyl]ester; decanethioic acid S-[3-(diethoxy-methyl-silanyl)-propyl]ester; and, decanethioic acid S-[3-(triethoxysilanyl)-propyl]ester.

5. The process of claim 1 wherein rubber (ii) is at least one rubber is selected from group consisting of emulsion polymerization-prepared styrene/butadiene copolymer rubber and organic solution polymerization-prepared styrene/butadiene rubber.

6. The process of claim 1 wherein rubber (ii) is at least one polybutadiene rubber.

7. The process of claim 6 wherein rubber (ii) is at least one polybutadiene rubber selected from the group consisting of cis-1,4-polybutadiene, 35-50 percent vinyl content vinyl polybutadiene rubber and 50-75 vinyl content vinyl polybutadiene rubber.

8. The process of claim 1 wherein rubber (ii) is at least one emulsion polymerization-derived styrene/butadiene rubber selected from the group consisting of emulsion polymerization-derived styrene/butadiene rubber of 20 to 29 weight percent bound styrene and emulsion polymerization-derived styrene/butadiene rubber of 30 to 45 weight percent bound styrene.

9. The process of claim 1 wherein the organic solution polymerization-prepared styrene/butadiene rubber of 5 to 50 weight percent bound styrene.

10. The process of claim 1 wherein the organic solution polymerization-prepared styrene/butadiene rubber has from 9 to 36 weight percent bound styrene.

11. The process of claim 1 wherein rubber (ii) is at least one tin-coupled styrene/butadiene rubber.

12. The process of claim 1 wherein rubber (ii) is at least one silane-functionalized organic solution polymerization-prepared 1,4-polybutadiene rubber.

13. The process of claim 1 wherein silane-reactive filler (iii) is at least one member selected from the group consisting of metal oxide, silica and siliceous material.

14. The process of claim 13 wherein silane reactive filler (iii) is at least one member selected from the group consisting of pyrogenic silica, precipitated silica, hydrated silica, titanium dioxide, alumina, aluminosilicate, clay and talc.

15. The process of claim 14 wherein the mixture of step (a) further comprises a filler that is essentially non-reactive with thiocarboxyl-functional hydrolyzable silane (i).

16. The process of claim 15 wherein the non-reactive filler is at least one member selected from the group consisting of porous organic polymer, carbon black, diatomaceous earth and silica characterized by a differential of less than 1.3 between the infrared absorbance at 3502 $cm^{-1}$ taken at 105° C. and taken at 500° C.

17. The process of claim 1 wherein each $R^4$, $R^6$ and $R^8$ is hydrogen and each $R^5$ and $R^7$ is an alkyl or aryl group containing up to 6 carbon atoms.

18. The process of claim 1 wherein the guanidine-containing base is at least one member selected from the group consisting of 1,3-dimethyl guanidine; 1,3-diethyl-guanidine; 1-methyl-3-phenyl guanidine; 1,3-diphenyl guanidine; 1,1,3,3-tetramethyl guanidine; 1 1,1,3,3-tetraphenyl guanidine; 1,1,3,3-tetrabutyl guanidine; and, 1,3-di-o-tolylguanidine.

19. The process of claim 1 wherein vulcanizing agent (vi) is at least one member selected from the group consisting of elemental sulfur and sulfur-donating compound.

20. The process of claim 1 wherein in step (a), the mixture contains from 0.5 to 3 weight percent activating agent (iv) based on the total weight of the rubber composition.

21. The process of claim 1 wherein in step (a), the mixture contains from 0.5 to 15 weight percent thiocarboxyl-functional hydrolyzable silane (i) based on the total weight of the rubber composition.

22. The process of claim 1 wherein in step (a), the mixture contains from 5 to 50 weight percent silane-reactive filler (iii) based on the total weight of the rubber composition.

23. The process of claim 1, wherein the organic solution polymerized-prepared styrene-butadiene rubber is organic solution polymerized-prepared styrene-butadiene rubber functionalized by an alkoxysilane derivative or a tin derivative.

24. The process of claim 1 wherein the thiocarboxyl-functional hydrolyzable silane (i) is octanethioic acid S-[3-(triethoxysilanyl)-propyl] ester, the rubber (ii) is organic solution polymerization-prepared styrene/butadiene rubber or polybutadiene, the one silane-reactive filler (iii) is particulate precipitated silica having reactive surface silanols, and the activating agent (iv) is diphenyl guanidine.

25. The process of claim 1 wherein the thiocarboxyl-functional hydrolyzable silane (i) is octanethioic acid S-[3-(triethoxysilanyl)-propyl] ester, the rubber (ii) is emulsion polymerization-prepared styrene/butadiene copolymer rubber, organic solution polymerization-prepared styrene/butadiene rubber or polybutadiene, the one silane-reactive filler (iii) is particulate precipitated silica having reactive surface silanols, the activating agent (iv) is diphenyl guanidine, the vulcanizing agent is sulfur, the primary accelerator is a sulfonamide and the secondary accelerators is a guanidine, dithiocarbamate or thiuram compound.

26. The process of claim 1 wherein the mechanical-working apparatus is a tangential mixer.

27. The cured rubber resulting from step (e) of claim 1.

28. The process of claim 1 wherein the mixture of step (a) further comprises a filler that is essentially non-reactive with thiocarboxyl-functional hydrolyzable silane (i).

* * * * *